United States Patent Office 3,228,988
Patented Jan. 11, 1966

3,228,988
ASYMMETRIC POLYHALOVINYL DISULFIDES
Paul C. Aichenegg, Prairie Village, Kans., and Carl D. Emerson, Kansas City, Mo., assignors to Chemagro Corporation, New York, N.Y., a corporation of New York
No Drawing. Original application Dec. 12, 1961, Ser. No. 158,887, now Patent No. 3,174,897, dated Mar. 23, 1965. Divided and this application May 16, 1963, Ser. No. 281,010
12 Claims. (Cl. 260—608)

This application is a divisional of application Serial No. 158,887, now Patent No. 3,174,897, filed December 12, 1961, which in turn is a continuation-in-part of application Serial No. 143,009 now Patent No. 3,155,720, filed September 28, 1961.

The present invention relates to novel asymmetrical disulfides, methods of making the same and their use as pesticides.

It is an object of the present invention to prepare novel polyhalovinyl alkyl (or aryl or haloaryl) disulfides.

A further object is to prepare improved compositions and processes for killing nematodes.

An additional object is to prepare improved compositions and processes for killing fungi.

Yet another object is to prepare improved compositions and processes for killing bacteria.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the formula $R_1SSR_2$ where $R_1$ is a hydrocarbon or haloaryl group and $R_2$ is polyhalovinyl wherein the halogen is either chlorine or bromine. Preferably all of the halogen atoms are chlorine.

Examples of compounds coming within the present invention are 1,2-dichlorovinyl methyl disulfide, 1,2-dichlorovinyl ethyl disulfide, 1,2-dichlorovinyl n-propyl disulfide, 1,2-dichlorovinyl isopropyl disulfide, 1,2-dichlorovinyl n-butyl disulfide, 1,2-dichlorovinyl isobutyl disulfide, 1,2-dichlorovinyl sec. butyl disulfide, 1,2-dichlorovinyl tert butyl disulfide, 1,2-dichlorovinyl n-amyl disulfide, 1,2-dichlorovinyl n-hexyl disulfide, 1,2-dichlorovinyl n-heptyl disulfide, 1,2-dichlorovinyl isoheptyl disulfide, 1,2-dichlorovinyl n-dodecyl disulfide, 1,2-dichlorovinyl benzyl disulfide, dichlorovinyl phenyl disulfide, 1,2-dichlorovinyl p-tolyl disulfide, 1,2-dichlorovinyl o-tolyl disulfide, 1,2-dichlorovinyl m-tolyl disulfide, 1,2-dichlorovinyl 2',3' xylyl disulfide, 1,2-dichloro p-butylphenyl disulfide, 1,2-dichlorovinyl p-dodecylphenyl disulfide, 1,2-dichlorovinyl p-phenylphenyl disulfide, 1,2-dichlorovinyl α-naphthyl disulfide, 1,2-dichlorovinyl β-naphthyl disulfide, 1,2-dichlorovinyl p-chlorophenyl disulfide, 1,2-dichlorovinyl o-chlorophenyl disulfide, 1,2-dichlorovinyl m-chlorophenyl disulfide, 1,2-dichlorovinyl 2'-chloro-4'-methylphenyl disulfide, 1,2-dichlorovinyl 2',4'-dichlorophenyl disulfide, 1,2-dichlorovinyl p-bromophenyl disulfide, 1,2-dibromovinyl methyl disulfide, 1,2-dibromovinyl ethyl disulfide, 1,2-dibromovinyl n-butyl disulfide, 1,2-dibromovinyl phenyl disulfide, 1,2-dibromovinyl p-tolyl disulfide, 1,2-dibromovinyl p-chlorophenyl disulfide, 1,2-dichlorovinyl cyclohexyl disulfide, 1,2-dichlorovinyl allyl disulfide, 1-bromo-2-chlorovinyl ethyl disulfide, 2,2-dichlorovinyl methyl disulfide, 2,2-dichlorovinyl ethyl disulfide, 2,2-dichlorovinyl n-propyl disulfide, 2,2-dichlorovinyl isopropyl disulfide, 2,2-dichlorovinyl n-butyl disulfide, 2,2-dichlorovinyl isobutyl disulfide, 2,2-dichlorovinyl t-butyl disulfide, 2,2-dichlorovinyl n-amyl disulfide, 2,2-dichlorovinyl n-hexyl disulfide, 2,2-dichlorovinyl cyclohexyl disulfide, 2,2-dichlorovinyl n-heptyl disulfide, 2,2-dichlorovinyl allyl disulfide, 2,2-dichlorovinyl n-dodecyl disulfide, 2,2-dichlorovinyl benzyl disulfide, 2,2-dichlorovinyl phenyl disulfide, 2,2-dichlorovinyl p-tolyl disulfide, 2,2-dichlorovinyl o-tolyl disulfide, 2,2-dichlorovinyl m-tolyl disulfide, 2,2-dichlorovinyl xylyl disulfide, 2,2-dichlorovinyl α-naphthyl disulfide, 2,2-dichlorovinyl p-butylphenyl disulfide, 2,2-dichlorovinyl p-chlorophenyl disulfide, 2,2-dichlorovinyl p-bromophenyl disulfide, 2,2-dichlorovinyl o-chlorophenyl disulfide, 2,2-dichlorovinyl m-chlorophenyl disulfide, 2,2-dichlorovinyl 2'-chloro-4'-methyl phenyl disulfide, 2-chloro-2-bromovinyl ethyl disulfide, 2,2-dibromovinyl methyl disulfide, 2,2-dibromovinyl ethyl disulfide, 2,2-dibromovinyl n-butyl disulfide, 2,2-dibromovinyl phenyl disulfide, 2,2-dibromovinyl p-tolyl disulfide, 2,2-dibromovinyl p-chlorophenyl disulfide, 2,2-dibromovinyl o-bromophenyl disulfide, 1,2,2-trichlorovinyl methyl disulfide, 1,2,2-trichlorovinyl ethyl disulfide, 1,2,2-trichlorovinyl m-propyl disulfide, 1,2,2-trichlorovinyl isopropyl disulfide, 1,2,2-trichlorovinyl n-butyl disulfide, 1,2,2-trichlorovinyl isobutyl disulfide, 1,2,2-trichlorovinyl n-amyl disulfide, 1,2,2-trichlorovinyl n-hexyl disulfide, 1,2,2-trichlorovinyl cyclohexyl disulfide, 1,2,2-trichlorovinyl n-hexyl disulfide, 1,2,2-trichlorovinyl benzyl disulfide, 1,2,2-trichlorovinyl phenyl disulfide, 1,2,2-trichlorovinyl p-tolyl disulfide, 1,2,2-trichlorovinyl o-tolyl disulfide, 1,2,2-trichlorovinyl m-tolyl disulfide, 1,2,2-trichlorovinyl p-chlorophenyl disulfide, 1,2,2-trichlorovinyl α-naphthyl disulfide, 1,2,2-tribromovinyl ethyl disulfide, 1,2,2-trichlorovinyl allyl disulfide, 1,2,2-tribromovinyl phenyl disulfide, 1,2-dichloro-2-bromovinyl ethyl disulfide, 1,2,2-tribromovinyl p-bromophenyl disulfide.

For most of the uses it is preferred that $R_1$ be a normal or iso alkyl group of not over 7 carbon atoms or benzyl or phenyl or lower alkyl phenyl or chloro or bromophenyl. When $R_1$ is alkyl most desirably it is not over 5 carbon atoms. The nematocidal and fungicidal activity of compounds where $R_1$ is a tertiary alkyl group is quite weak compared to the corresponding normal alkyl compounds.

While the compounds of the present invention are particularly noted for their nematocidal activity, in many cases they also exhibit fungicidal activity and bactericidal activity. Some of the compounds have nematocidal activity at rates as low as 1 p.p.m. and were 100% effective at 3 p.p.m.

The compounds of the present invention are preferably prepared by reacting the appropriate polyhalovinyl sulfenyl chloride or bromide with the desired aliphatic or aromatic mercaptan. Alternatively they can be prepared by dehydrohalogenation of the appropriate polyhaloethyl alkyl (or aryl) disulfide. The latter compounds can be made by reacting the appropriate polyhaloethyl sulfenyl chloride or bromide with the desired aliphatic or aromatic mercaptan.

The temperature of reaction can be varied, e.g., room temperature can be employed. However, preferably the reaction is initiated at lower temperatures since the sulfenyl halides have a tendency to decompose at elevated temperatures.

The general procedure employed in Examples 1–15 (unless otherwise noted in the example) for preparing the polyhalovinyl alkyl (or aryl, or benzyl) disulfide was as follows:

A known quantity of the mercaptan was dissolved in 2–3 parts of dry chloroform or carbon tetrachloride as a solvent and then the polyhalovinyl sulfenyl chloride was added dropwise with cooling to 4–8° C. The reaction proceeded rapidly and smoothly taking about 30 minutes. The concentration of the gaseous hydrogen chloride formed during the reaction was reduced by applying a vacuum of 200–250 mm. Hg throughout the reaction period. After allowing the reaction mixture to stand at room temperature for 2 hours (or in some cases overnight), the solvent and residual gaseous hydrogen chloride were removed in vacuum. Yields of 80% to quantitative of the desired product were obtained as crude residues which in most cases were further purified by distillation in high vacuum.

Unless otherwise indicated all parts and percentages are by weight.

EXAMPLE 1

3.29 grams (0.053 mol) of ethyl mercaptan were dissolved in 25 ml. of carbon tetrachloride and treated as described above with 8.65 grams (0.053 mol) of 1,2-dichlorovinyl sulfenyl chloride to give a quantitative yield of 1,2-dichlorovinyl ethyl disulfide as a yellow oil, $n_D^{27}$ 1.5700. The pure product boiled at 50–51° C. at 0.06 mm. Hg, $d_{20}^{20}$ 1.3266, $n_D^{27}$ 1.5694, Cl 36.9% (theory 37.6%), S 34.5% (theory 33.8%).

EXAMPLE 2

The procedure of Example 1 was repeated using 4.91 grams (0.0399 mol) of benzyl mercaptan and 6.52 grams (0.0399 mol) of 1,2-dichlorovinyl sulfenyl chloride to obtain 1,2-dichlorovinyl benzyl disulfide in a quantitative yield, $n_D^{27}$ 1.6200. The pure product was a light yellow oil boiling at 92–93° C. at 0.014 mm. Hg, $n_D^{26}$ 1.6182, $d_{20}^{20}$ 1.331, Cl 27.5% (theory 28.3%), S 25.9% (theory 25.5%).

EXAMPLE 3

The procedure of Example 1 was repeated using 4.65 grams (0.0423 mol) of thiophenol and 6.9 grams (0.0423 mol) of 1,2-dichlorovinyl sulfenyl chloride to obtain 1,2-dichlorovinyl phenyl disulfide in a quantitative yield. The pure product was a yellow oil B.P. 87–88° C. at 0.035 mm. Hg, $n_D^{26}$ 1.6366, $d_{20}^{20}$ 1.374, Cl 30.6% (theory 29.9%), S 26.9% (theory 27.0%).

EXAMPLE 4

The procedure of Example 1 was repeated except that 11 grams of 2,2-dichlorovinyl sulfenyl chloride were dissolved in 25 ml. of chloroform and gaseous methyl mercaptan added at 0–5° C. until the solution decolorized. This mixture was then treated as in Example 1 to give a quantitative yield of 2,2-dichlorovinyl methyl disulfide. The pure product was a light yellow oil B.P. 43–44° C. at 0.09 mm. Hg, $n_D^{26}$ 1.5844, $d_{20}^{20}$ 1.401, Cl 40.5% (theory 40.6%), S 36.3% (theory 36.6%).

EXAMPLE 5

The procedure of Example 1 was repeated using 3.29 grams (0.053 mol) of ethyl mercaptan with 8.63 grams (0.053 mol) of 2,2-dichlorovinyl sulfenyl chloride to give a quantitative yield of 2,2-dichlorovinyl ethyl disulfide. The pure product was a yellow oil B.P. 49–50° C. at 0.08 mm. Hg, $n_D^{26}$ 1.5695, $d_{20}^{20}$ 1.330, Cl 37.5% (theory 37.6%), S 34.4% (theory 33.8%).

EXAMPLE 6

The procedure of Example 1 was repeated using 7.5 grams (0.0985 mol) of isopropyl mercaptan with 16.1 grams (0.0985 mol) of 2,2-dichlorovinyl sulfenyl chloride to give a 93% yield of 2,2-dichlorovinyl isopropyl disulfide $n_D^{27}$ 1.5516. The pure product was a light yellow oil B.P. 51–52° C. at 0.05 mm. Hg, $n_D^{26}$ 1.5539, $d_{20}^{20}$ 1.266, Cl 35.5% (theory 35.0%), S 31.6% (theory 31.5%).

EXAMPLE 7

The procedure of Example 1 was repeated using 4.16 grams (0.0461 mol) of n-butyl mercaptan with 7.52 grams (0.0461 mol) of 2,2-dichlorovinyl sulfenyl chloride to give a 90% yield of 2,2-dichlorovinyl n-butyl sulfide, $n_D^{26}$ 1.5483. The pure product was a light yellow oil B.P. 68–69° C. at 0.06 mm. Hg, $n_D^{26}$ 1.5486, $d_{20}^{20}$ 1.234, Cl 33.0% (theory 32.7%), S 29.9% (theory 29.5%).

EXAMPLE 8

The procedure of Example 1 was repeated using 8.31 grams (0.0922 mol) of tert butyl mercaptan with 15.1 grams (0.0922 mol) of 2,2-dichlorovinyl sulfenyl chloride to give a quantitative yield of 2,2-dichlorovinyl tert butyl disulfide, $n_D^{27}$ 1.5416. The pure product was a light yellow oil B.P. 53–54° C. at 0.05 mm. Hg, $n_D^{26}$ 1.5445, $d_{20}^{20}$ 1.271, Cl 32.9% (theory 32.7%), S 28.98% (theory 29.5%).

EXAMPLE 9

The procedure of Example 1 was repeated using 20.2 grams (0.1 mol) of n-dodecyl mercaptan with 16.3 grams (0.1 mol) of 2,2-dichlorovinyl sulfenyl chloride to give a 96% yield of 2,2-dichlorovinyl n-dodecyl disulfide as an oil, $n_D^{22}$ 1.5192, $d_{20}^{20}$ 1.084, Cl 23.3% (theory 21.6%), S 19.4% (theory 19.4%).

EXAMPLE 10

The procedure of Example 1 was repeated using 12.9 grams (0.056 mol) of n-tetradecyl mercaptan with 9.15 grams (0.056 mol) of 2,2-dichlorovinyl sulfenyl chloride to give a quantitative yield of 2,2-dichlorovinyl n-tetradecyl disulfide as a light yellow oil, $n_D^{27}$ 1.5032, $d_{20}^{20}$ 1.035, Cl 19.5% (theory 19.9%), S 17.3% (theory 17.9%).

EXAMPLE 11

The procedure of Example 1 was repeated using 4.84 grams (0.0398 mol) of benzyl mercaptan with 6.5 grams (0.0398 mol) of 2,2-dichlorovinyl sulfenyl chloride to give a quantitative yield of 2,2-dichlorovinyl benzyl disulfide, $n_D^{26}$ 1.6172. The pure product was a light yellow oil B.P. 96–99° C. at 0.017 mm. Hg, $n_D^{26}$ 1.6179, $d_{20}^{20}$ 1.325, Cl 28.8% (theory 28.3%), S 24.95% (theory 25.5%).

EXAMPLE 12

The procedure of Example 1 was repeated using 4.65 grams (0.0422 mol) of thiophenol with 6.88 grams (0.0422 mol) of 2,2-dichlorovinyl sulfenyl chloride to give a 90% yield of 2,2-dichlorovinyl phenyl disulfide, $n_D^{26}$ 1.6368. The pure product was a yellow oil B.P. 87–88° C. at 0.023 mm. Hg, $n_D^{26}$ 1.6368, $d_{20}^{20}$ 1.376, Cl 30.5% (theory 29.9%), S 25.8% (theory 27.0%).

EXAMPLE 13

The procedure of Example 1 was repeated using 9.9 grams (0.0797 mol) of p-toluenethiol with 13.8 grams (0.079 mol) of 2,2-dichlorovinyl sulfenyl chloride to give a quantitative yield of 2,2-dichlorovinyl p-tolyl disulfide as an oil, $n_D^{27}$ 1.6220, $d_{20}^{20}$ 1.359, Cl 34.5% (theory 28.3%), S 22.9% (theory 25.5%).

EXAMPLE 14

The procedure of Example 1 was repeated using 1.51 grams (0.0243 mol) of ethyl mercaptan with 4.8 grams (0.0243 mol) of 1,2,2-trichlorovinyl sulfenyl to give an 83.5% yield of 1,2,2-trichlorovinyl ethyl disulfide as an oil, $n_D^{26}$ 1.5850, $d_{20}^{20}$ 1.472, Cl 49.2% (theory 47.8%), S 28.03% (theory 28.7%).

EXAMPLE 15

The procedure of Example 1 was repeated using 2.67 grams (0.0243 mol) of thiophenol with 4.8 grams (0.0243 mol) of 1,2,2-trichlorovinyl sulfenyl chloride to give an 83.5% yield of 1,2,2-trichlorovinyl phenyl disulfide as an oil $n_D^{26}$ 1.6402, Cl 39.7% (theory 39.3%), S 23.5% (theory 23.6%).

The polyhalovinyl alkyl (or aryl or haloaryl) disulfides as stated above can also be prepared by dehydrohalogenating a polyhaloethyl alkyl (or aryl or haloaryl) disulfide. In Examples 16-20 this procedure is employed.

EXAMPLE 16

To 10 grams (0.0475 mol) of 1,2,2-trichloroethyl methyl disulfide dissolved in 25 ml. of heptane were added dropwise 4.85 grams (0.0475 mol) of triethyl amine at 35-40° C. The mixture was then allowed to stand overnight at room temperature. The triethyl amine hydrochloride formed was removed by washing with water. The unreacted triethyl amine was removed by washing the organic layer first with dilute hydrochloric acid followed by dilute aqueous sodium bicarbonate and water. The heptane solution was then dried over anhydrous magnesium sulfate and the solvent removed in a high vacuum. The product was 1,2-dichlorovinyl methyl disulfide, an oil obtained in a yield of 60% and having an $n_D^{22}$ 1.5925, Cl 41.3% (theory 40.6%) S 36.4% (theory 36.6%).

EXAMPLE 17

The procedure of Example 16 was repeated using 15 grams (0.0591 mol) of 1,2,2-trichloroethyl n-butyl disulfide with 6.05 grams (0.0591 mol) of triethyl amine to give an 83% yield of 1,2-dichlorovinyl n-butyl disulfide as an oil, $n_D^{22}$ 1.5517, $d_{20}^{20}$ 1.267, Cl 35.2% (theory 32.7%), S 29.4% (theory 29.5%).

EXAMPLE 18

The procedure of Example 16 was repeated using 18.3 grams (0.05 mol) of 1,2,2-trichloroethyl-n-dodecyl disulfide with 5.06 grams (0.05 mol) of triethyl amine to give an 88.5% yield of 1,2-dichlorovinyl-n-dodecyl disulfide as a dark oil, $n_D^{27}$ 1.5125, Cl 21.2% (theory 21.6%), S 18.6% (theory 19.4%).

EXAMPLE 19

The procedure of Example 16 was repeated using 14.4 grams (0.05 mol) of 1,2,2-trichloroethyl-p-tolyl disulfide with 5.06 grams (0.05 mol) of triethyl amine to give a 92% yield of 1,2-dichlorovinyl-p-tolyl disulfide as a dark oil, $n_D^{27}$ 1.6241, Cl 30.6% (theory 28.3%), S 24.7% (theory 25.5%).

EXAMPLE 20

The procedure of Example 16 was repeated using 15.4 grams (0.05 mol) of 1,2,2-trichloroethyl-p-chlorophenyl disulfide with 5.06 grams (0.05 mol) of triethyl amine to give an 89% yield of 1,2-dichlorovinyl-p-chlorophenyl disulfide as a dark oil, $n_D^{26}$ 1.6460, Cl 38.9% (theory 39.2%), S 22.4% (theory 23.6%).

In place of triethyl amine in the procedure of Examples 16-20 there can be used any other conventional hydrochloric acid acceptors, e.g. other alkyl amines such as tributyl amine, tricyclohexyl amine, aryl amines, e.g. N,N-dimethyl aniline, N,N-diethyl aniline, heterocyclic amines, e.g. pyridine and N-methyl piperidine as well as inorganic bases such as potassium hydroxide.

The compounds of the present invention can be used alone as nematocides, fungicides and bactericides but it has been found desirable to apply them to the pest, e.g. to the soil habitat of nematodes, together with inert solids to form dusts, or more preferably suspended in a suitable liquid diluent, preferably water. There can also be added surface active agents and inert solids in such liquid formulations. Desirably, 0.05-1% by weight of surface active agent is employed. The active ingredient can be from 0.01 to 95% by weight of the entire composition in such cases.

In place of water there can be employed organic solvents as carriers, e.g. hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g. ethylene glycol monomethyl ether and diethylene glycol monomethyl ether, alcohols, e.g. ethanol, isopropanol and amyl alcohol, etc.

The novel pesticides can also be applied as aerosols, e.g. by dispersing them in air by means of a compressed gas such as dichlorodifluoromethane or trichlorofluoromethane and other Freons for example.

The pesticides of the present invention can also be applied with inert nematocidal, fungicidal, bactericidal or insecticidal adjuvants or carriers such as talc, pyrophyllite, synthetic fine silica, Attaclay, kieselguhr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin.

It is frequently desirable to incorporate a surface active agent in the pesticidal compositions of this invention. Such surface active agents, i.e. wetting agent, are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylary polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkylphenol-ethylene oxide condensation products, e.g. p-isooctylphenol condensed with 10 ethylene oxide units, soaps, e.g. sodium stearate and potassium oleate, sodium salt of propylnaphthalene sulfonic acid, (di-2-ethyl hexyl) ester of sodium sulfosuccinate, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g. Ethofat 7 and 13, sodium N-methyl-N-oleyltaurate, Turkey Red Oil, sodium dibutyl-naphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, e.g. Pluronic 61, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate.

The solid and liquid formulations can be prepared by any of the conventional methods. Thus the active ingredient can be mixed with the solid carrier in finely divided form in amounts small enough to preserve the free-flowing property of the final dust composition.

In the following examples or tables illustrating nematocidal activity the disulfides were formulated as wettable powders consisting of 50% of the disulfide, 46% Hi-Sil 233 (ultra fine silica), 2% Marasperse N (sodium lignin sulfonate) and 2% Pluronic L-61 (polyethylene oxide-propylene oxide molecular weight about 1000). This wettable powder is hereinafter designated as Formulation A.

These 50% by weight disulfide containing wettable powders were diluted with water to such an extent as to obtain final concentrations of the disulfides of 200, 100, 50, 25, 12.5, 6, 3 and 1 p.p.m. during the actual tests.

The saprophytic nematode tests were carried out in water as the medium with Panagrellus and Rhabditis spp. at room temperature. The results were recorded as percent kill after a 4 days' incubation period. The blank mortality was a 5-10% kill.

The compounds employed in the tests as nematocides, fungicides and bactericides had the formula $R_1SSR_2$ where $R_1$ is the radical indicated in the tables and $R_2$ is designated in the tables as 1,2-dichloro or 2,2-dichloro or 1,2,2-trichloro depending upon which polychlorovinyl group was present as $R_2$.

Table 1

| $R_1$ | $R_2$ | Percent kill of saprophytic nematodes at rates of— | | | | |
|---|---|---|---|---|---|---|
| | | 200 | 100 | 50 | 25 | 12.5 |
| Methyl | 1,2-dichloro | 100 | 100 | 100 | 100 | 100 |
| Ethyl | do | 100 | 100 | 100 | 100 | 100 |
| n-Butyl | do | 100 | 100 | 100 | 100 | 100 |
| n-Dodecyl | do | 20 | 5 | 5 | 5 | 5 |
| Benzyl | do | 100 | 100 | 100 | 70 | 40 |
| Phenyl | do | 80 | 80 | 50 | 50 | 50 |
| p-Tolyl | do | 100 | 100 | 100 | 100 | 100 |
| p-Chlorophenyl | do | 100 | 100 | 100 | 100 | 100 |
| Methyl | 2,2-dichloro | 100 | 100 | 100 | 100 | 100 |
| Ethyl | do | 100 | 100 | 100 | 100 | 100 |
| Isopropyl | do | 100 | 100 | 100 | 100 | 70 |
| n-Butyl | do | 100 | 100 | 100 | 100 | 80 |
| n-Dodecyl | do | 100 | 80 | 80 | 50 | 30 |
| Benzyl | do | 100 | 70 | 50 | 30 | 30 |
| Phenyl | do | 100 | 100 | 80 | 80 | 50 |
| p-Tolyl | do | 80 | 80 | 50 | 50 | 50 |
| Ethyl | 1,2,2-trichloro | 100 | 100 | 100 | 100 | 100 |
| Phenyl | do | 100 | 100 | 100 | 100 | 100 |

Those compounds which showed up best in the test recorded in Table 1 were further tested against the saprophytic nematodes at reduced amounts as shown in Table 2.

Table 2

| $R_1$ | $R_2$ | Percent kill of saprophytic nematodes at rates, p.p.m. | | |
|---|---|---|---|---|
| | | 6 | 3 | 1 |
| Methyl | 1,2-dichloro | 90 | 40 | 20 |
| Ethyl | do | 80 | 30 | 10 |
| n-Butyl | do | 70 | 30 | 10 |
| p-Tolyl | do | 100 | 100 | 60 |
| p-Chlorophenyl | do | 100 | 100 | 80 |
| Methyl | 2,2-dichloro | 40 | 5 | 5 |
| Ethyl | do | 100 | 40 | 20 |
| Isopropyl | do | 70 | 40 | 20 |
| Phenyl | do | 40 | 5 | 5 |
| p-Tolyl | do | 20 | 5 | 5 |
| Ethyl | 1,2,2-trichloro | 100 | 80 | 30 |
| Phenyl | do | 70 | 40 | 10 |

In commercial practice the composition containing the nematocide is applied to the soil infested with nematodes.

The pure compounds were also tested as bactericides as indicated in Table 3. The compounds were incorporated in Formulation A and this mixture added to an agar culture of the bacteria. In Table 3 "a" indicates bactericidal activity at the concentration employed and "n" indicates no activity. The concentrations are in p.p.m.

Table 3

| $R_1$ | $R_2$ | Erwinia carotovora | | Pseudomonas coronafacions | | Xanthomonas vesicatoria | |
|---|---|---|---|---|---|---|---|
| | | 1,000 | 100 | 1,000 | 100 | 1,000 | 100 |
| Methyl | 1,2-dichloro | a | n | n | n | n | n |
| Ethyl | do | a | a | a | n | a | n |
| Benzyl | do | n | n | n | n | a | n |
| p-Tolyl | do | a | a | a | a | a | n |
| p-Chlorophenyl | do | a | n | a | a | a | a |
| Methyl | 2,2-dichloro | a | n | a | n | n | n |
| Ethyl | do | a | n | a | n | a | n |
| Isopropyl | do | a | n | n | n | n | n |
| n-Butyl | do | a | a | n | n | a | n |
| Phenyl | do | a | n | a | n | a | n |
| Ethyl | 1,2,2-trichloro | a | a | a | n | a | n |
| Phenyl | do | a | a | a | a | a | n |

The compounds were also tested as fungicides in plate fungicide tests as indicated in Table 4. The compounds were made up into Formulation A and then added to agar cultures of the fungi. In the table, 10 indicates 100% effectiveness and 0 indicates no effectiveness. In Table 4, P stands for Pythium spp., F for Fusarium, R for Rhizoctonia, H for Helminthosporium and S for *Stemphyllium sarcinaeformae*. The concentrations are expressed as p.p.m.

Table 4

| $R_1$ | $R_2$ | P | | F | | R | | H | | S | |
|---|---|---|---|---|---|---|---|---|---|---|---|
| | | 1,000 | 100 | 1,000 | 100 | 1,000 | 100 | 1,000 | 100 | 1,000 | 100 |
| Methyl | 1,2-dichloro | 10 | 6 | 2 | 0 | 4 | 1 | 0 | 0 | 10 | 0 |
| Ethyl | do | 10 | 4 | 3 | 0 | 8 | 5 | 7 | 3 | 10 | 4 |
| n-Dodecyl | do | 0 | 0 | 0 | 0 | 6 | 2 | 4 | 0 | 6 | 1 |
| Benzyl | do | 6 | 0 | 2 | 0 | 0 | 0 | 0 | 0 | 6 | 2 |
| Phenyl | do | 8 | 3 | 0 | 0 | 3 | 0 | 0 | 0 | 10 | 0 |
| p-Tolyl | do | 10 | 4 | 4 | 0 | 0 | 0 | 0 | 0 | 0 | 0 |
| p-Chlorophenyl | do | 10 | 10 | 4 | 0 | 8 | 5 | 4 | 1 | 10 | 0 |
| Methyl | 2,2-dichloro | 4 | 0 | 0 | 0 | 5 | 0 | 4 | 0 | 10 | 0 |
| Ethyl | do | 0 | 0 | 2 | 0 | 8 | 4 | 5 | 0 | 8 | 5 |
| Isopropyl | do | 10 | 0 | 0 | 0 | 7 | 4 | 4 | 0 | 10 | 5 |
| n-Butyl | do | 0 | 0 | 0 | 0 | 4 | 0 | 0 | 0 | 10 | 0 |
| n-Dodecyl | do | 0 | 0 | 0 | 0 | 6 | 2 | 0 | 0 | 10 | 4 |
| n-Tetradecyl | do | 0 | 0 | 0 | 0 | 7 | 3 | 2 | 0 | 0 | 0 |
| Benzyl | do | 0 | 0 | 0 | 0 | 0 | 0 | 5 | 0 | 0 | 0 |
| Phenyl | do | 0 | 0 | 0 | 0 | 0 | 0 | 4 | 0 | 0 | 0 |
| Ethyl | 1,2,2-trichloro | 10 | 8 | 0 | 0 | 8 | 5 | 4 | 1 | 10 | 10 |
| Phenyl | do | 10 | 0 | 0 | 0 | 6 | 4 | 5 | 0 | 10 | 8 |

We claim:
1. A compound having the formula $R_1SSR_2$ where $R_1$ is selected from the group consisting of alkyl, allyl, cyclohexyl, phenyl, lower alkyl phenyl, naphthyl, benzyl and halophenyl, and $R_2$ is polyhalovinyl group, the halo atoms of said compound having an atomic weight between 35 and 80.

2. Polychlorovinyl alkyl disulfide wherein the alkyl group has 1 to 14 carbon atoms.

3. A compound according to claim 1 where $R_1$ is n-alkyl having 1 to 7 carbon atoms and $R_2$ is polychlorovinyl.

4. A compound according to claim 1 wherein $R_1$ is isoalkyl having 3 to 7 carbon atoms and $R_2$ is polychlorovinyl.

5. A compound according to claim 1 wherein $R_1$ is n-alkyl having 1 to 5 carbon atoms and $R_2$ is 1,2-dichlorovinyl.

6. A compound according to claim 1 wherein $R_1$ is n-alkyl and $R_2$ is 2,2-dichlorovinyl.

7. A compound according to claim 1 wherein $R_1$ is n-alkyl having 1 to 5 carbon atoms and $R_2$ is 1,2,2-trichlorovinyl.

8. A compound according to claim 1 wherein $R_1$ is phenyl and $R_2$ is polychlorovinyl.

9. A compound according to claim 1 wherein $R_1$ is lower alkyl phenyl and $R_2$ is polychlorovinyl.

10. A compound according to claim 1 wherein $R_1$ is tolyl and $R_2$ is polychlorovinyl.

11. A compound according to claim 1 wherein $R_1$ is monochlorophenyl and $R_2$ is polychlorovinyl.

12. A compound according to claim 1 wherein $R_1$ is benzyl and $R_2$ is polychlorovinyl.

References Cited by the Examiner

UNITED STATES PATENTS

| 2,796,437 | 6/1957 | Park | 260—608 |
| 3,038,014 | 6/1962 | Geering | 260—608 |

OTHER REFERENCES

Theilheimer: "Synthetic Methods of Organic Chemistry," 6, page 215, #599.

CHARLES B. PARKER, *Primary Examiner.*

DELBERT R. PHILLIPS, *Assistant Examiner.*